United States Patent [19]

Boen

[11] Patent Number: 4,591,323
[45] Date of Patent: May 27, 1986

[54] EXTRUDER AND CALIBRATING APPARATUS FOR MAKING RIBBED OR GROOVED PIPE

[75] Inventor: Per Boen, Snarøya, Norway

[73] Assignee: A/S Sonnichsen Rorvalseverket, Oslo, Norway

[21] Appl. No.: 734,275

[22] PCT Filed: Sep. 18, 1984

[86] PCT No.: PCT/NO84/00035

§ 371 Date: May 8, 1985

§ 102(e) Date: May 8, 1985

[87] PCT Pub. No.: WO85/01244

PCT Pub. Date: Mar. 28, 1985

[30] Foreign Application Priority Data

Sep. 23, 1983 [NO] Norway .................... 833433

[51] Int. Cl.[4] .................... B29C 47/94; B29C 47/90; B29D 23/18

[52] U.S. Cl. .................... 425/97; 425/326.1; 425/376 R; 425/380; 425/392

[58] Field of Search .................... 425/97, 376 R, 377, 425/385, 392, 376 B, 325, 380, 381, 326.1, 378 R; 264/177 R, 209.2, 209.4, 310

[56] References Cited

U.S. PATENT DOCUMENTS

| | | | |
|---|---|---|---|
| 2,443,289 | 6/1948 | Bailey | 425/97 |
| 2,512,844 | 6/1950 | Weber | 425/97 |
| 2,688,153 | 9/1954 | Gebauer et al. | 425/97 |
| 2,743,511 | 5/1956 | Genovese | 264/177 F |
| 3,212,154 | 10/1965 | Crumpler | 425/380 |
| 3,221,805 | 5/1966 | Given | 425/380 |
| 3,244,781 | 4/1966 | Covington et al. | 425/379 R |
| 3,577,935 | 5/1971 | Reinhart | 425/192 |
| 3,659,987 | 5/1972 | Mixell et al. | 425/97 |
| 3,666,389 | 5/1972 | Nelson | 425/381 |
| 3,685,147 | 8/1972 | Nevin et al. | 264/177 R |
| 3,711,232 | 1/1973 | Van Zon | 425/326.1 |
| 3,844,700 | 10/1974 | Sokolow | 425/326.1 |
| 4,017,244 | 4/1977 | Vellani | 425/369 |
| 4,053,274 | 10/1977 | Lemelson | 425/381 |
| 4,077,758 | 3/1978 | de Putter | 425/392 |
| 4,087,222 | 5/1978 | Noel | 425/107 |
| 4,091,064 | 5/1978 | Kakinuma et al. | 264/174 |
| 4,181,486 | 1/1980 | Saito | 425/381 |
| 4,548,567 | 10/1985 | Missout | 425/113 |

FOREIGN PATENT DOCUMENTS

| | | | |
|---|---|---|---|
| 2200964 | 7/1973 | Fed. Rep. of Germany | 425/325 |
| 0051440 | 3/1982 | Japan | 425/325 |
| 1082538 | 9/1957 | United Kingdom . | |
| 1480632 | 7/1977 | United Kingdom . | |
| 532530 | 4/1975 | U.S.S.R. | 425/325 |

Primary Examiner—Willard E. Hoag

[57] ABSTRACT

An extruder assembly (1) for extruding round, cylindrical plastic pipe having a smooth inner pipe wall and a ribbed or ridged outer pipe wall, comprising a feed screw (2) for transporting and softening the plastic material (4), and an annular nozzle having a central mandrel (6). The mandrel constitutes a cylindrical, coaxial extension of the feed screw. The mold part (8) of the nozzle is provided with one or more parallel, helical grooves (14) with the spiral extending in the direction of rotation of the screw and mandrel, and the mold part (8) is provided with a lubricating device (17) for lubricating the molding surface of the mold part. A calibrating device (27) with helical grooves (28) is provided downstream of the annular nozzle.

11 Claims, 1 Drawing Figure

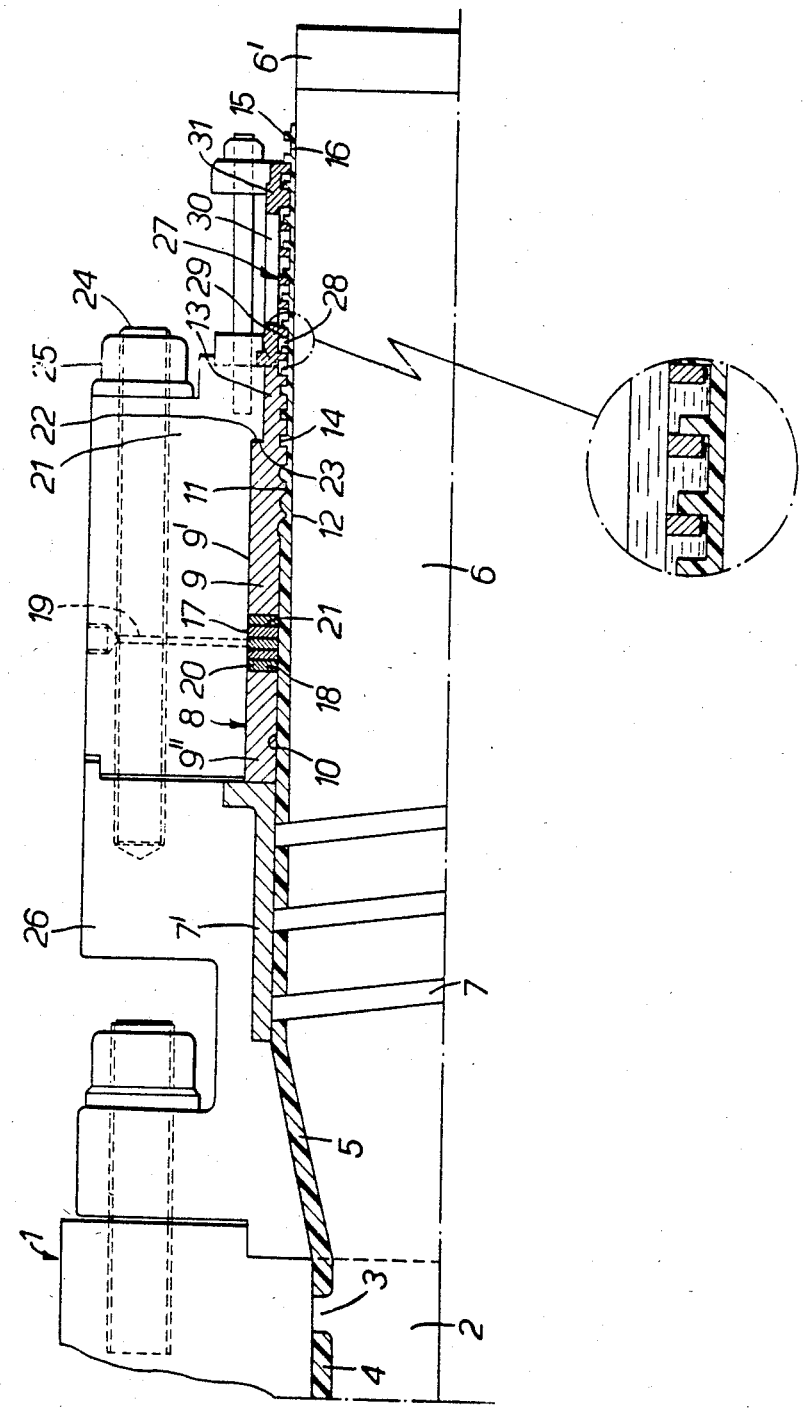

EXTRUDER AND CALIBRATING APPARATUS FOR MAKING RIBBED OR GROOVED PIPE

The present invention relates to an extruder assembly for extruding round, cylindrical plastic pipe having a smooth inner wall and a rigid outer wall surface.

It has long been realized that pipes having external ribs or ridges offer great advantages over smooth-walled pipes for applications in which the pipe is subjected to radial loading. Such loads may arise from internal fluid pressure or external ground pressure. The ribs provide the pipe with high annular strength in relation to weight, and permit a savings of material when producing the pipe.

Corrugated pipes, e.g., pipes having both internal and external ridges, have long been produced for different purposes. Such pipes have high annular strength in relation to their weight, but they are not suited for use as conduits for water supply or waste discharge because the pipe's flow resistance is too high. Such pipes have been used as electrical conduit pipes and drainage pipes. Corrugated pipes have, however, been utilized to some extent for producing pipes of the type defined above, using a second extruder to produce a smooth pipe and inserting this within the corrugated pipe, welding the two together in a common tool complex. Pipes having a smooth inside wall and a ridged outer surface have also been produced by cutting ridges or ribs in the outer wall of a smooth pipe. Both of these methods are expensive, and are only suited only for certain types of plastic.

British Pat. No. 618.536 discloses a method for producing plastic piping having a smooth inner wall and a ridged outer surface in which the ribs follow a helical path. According to the patent specification, this pipe is produced directly from only one extruder, the extruder's mandrel being an extention of its Archimedean screw and being provided with external ribs that follow a helical path. The theory is that the rotating mandrel shall impart a rotary motion to the plastic material exiting from the extruder nozzle. The external molding tool is provided with grooves that follow a helical path. This patent was applied for as early as 1944, at the very beginning of modern plastics technology, but no one has yet managed to actually produce a plastic pipe having a ribbed outer surface and a smooth inner wall directly from a single extruder.

The main object of the invention, based on the above prior art, is to provide a plastics extruder with which one can directly and continuously produced a plastic pipe having a smooth inner wall and a ribbed outer wall surface.

One of the major problems with such productions is associated with the lubrication of the annular nozzle's stationary outer mold section. Both the amount of lubricant and the continuity of its application are relatively critical factors. If too little lubricant is supplied, the adhesion between the plastic material and the wall of the mold will be too high and the plastic will stick to the mold wall, resulting in an interruption of the production process. If too much lubricant is supplied, the excess lubricant will become intermixed with the plastic material, and the quality of the outer pipe surface will be unacceptable. This may also cause interrupted production.

A particular object of the invention, therefore, is to ensure satisfactory lubrication of the internal wall of the stationary, outer section of the mold, thereby enabling continuous production of plastic pipes of good quality.

In any extrusion of plastic profiles, e.g., plastic pipe, the extruded profile must pass through a calibrating device to ensure that the product's dimensions are stable and that it is a acceptable quality. In the case of extruded pipes, the pipe is guided through a sleeve whose internal dimensions correspond exactly to the outside dimensions of the finished pipe. To obtain firm contact between the outer pipe wall and the internal sleeve wall, one can either introduce compressed air into the pipe, or the pipe wall can be drawn out toward the sleeve wall by means of vacuum introduced through small apertures in the sleeve wall.

Experiments have shown that neither of these methods is entirely satisfactory for producing pipes of the type in question here, because serious sealing problems arise when producing pipes which have both an axial and a rotary movement. Another disadvantage of this type of calibration is that it may cause some bulging in the inner wall of the pipe, owing to the pressure difference. This obviously has a negative effect on the quality of the pipe, especially if it is to be used as a fluid conduit, since the pipe's flow resistance will be substantially increased.

It is therefore another object of the invention to provide a calibrating device suitable for the production of this kind of pipe, which ensures that interruptions of the production process will be held to a minimum and at the same time ensures the production of good quality pipes.

These objectives are achieved according to the invention with an extruder assembly for extruding round, cylindrical plastic pipe having a smooth inner pipe wall and a ribbed or ridged outer wall surface, comprising a feed screw for transporting and softening the plastic material and an annular nozzle having a central mandrel which constitutes a round, coaxial extension of the feed screw, wherein the stationary outer mold section of the annular nozzle is provided with one or more parallel, helical grooves with the spiral extending in the direction of rotation of the screw and mandrel, wherein the outer mold section is provided with a lubricating device for lubricating the sliding surface of the plastic, and wherein a calibrating device having helical grooves is arranged downstream of the annular nozzle, and the assembly is characterized in that the lubricating device consists of radial slots between parts of the outer mold wall, which parts are movable in relation to each other for regulation of the slot width, and that the slot or slots are connected to a source of lubricant which supplies lubricant under pressure.

A practical embodiment of the invention is characterized in that the movable parts consist of auxiliary movable, annular disks. In this connection, a preferable embodiment is characterized in that the radial end surfaces of the disks have a roughened surface. To facilitate mounting and disassembly of the disks, these may be divided into segments.

A further feature of the invention is that one or more radial lubricating channels are connected to the outer periphery of the disks, which via respective axial channels distribute lubricant to all of the slots between the disks, and optionally also to slots between the outer disks and the adjacent edge of the stationary mold wall.

By means of the invention supply of lubricant to the surface of the pipe in different positions on the ribs and the pipe wall is obtained. With other words, it is possible to obtain a balanced flow speed of the material for the formation of the ribs and the pipe wall in the initial phase of the formation of the whole pipe by means of lubricant supply on different times to the two areas of the pipe.

With the assembly of the invention, reliable and uniform lubrication between the plastic material and the stationary mold wall is obtained. The supply of lubricant can be increased or reduced by means of the pressure with which the movable parts, i.e. the annular disks, are pressed together. It is simple to clean the lubricant slots because the parts, i.e. the disks, can be removed and cleaned. This is necessary because the plastic material, after a period of time, will leave a coating on the mold surface. The amount of lubricant can also be regulated by the degree of roughness on the adjacent surfaces of the disks.

A calibrating device according to the invention is characterized in that its grooves have a larger axial width than the ribs or ridges formed by the nozzle in the outside wall of the pipe.

In a preferred embodiment, the grooves also have a greater axial height than the ribs. In a further feature, the grooves in the calibrating device receive a direct supply of cooling liquid.

To provide an additional safeguard against interruptions of the production process, it is a feature of the invention that the free end of the rotating mandrel extends beyond the end of the calibrating device. In a preferred embodiment, the end portion of the mandrel has a slightly conical configuration, tapering toward the outer, free end thereof.

The calibrating device of the invention does not employ a pressure difference between the interior of the pipe and its exterior. No compressed air is introduced into the pipe, nor is vacuum utilized in the calibrating sleeve. Only a radial edge of the calibrating device is in contact with the pipe's helical ribbing, and tests have shown that this produces much less risk of "tearing" the plastic. Cooling liquid is introduced directly into the grooves, and thus flushes against both the top of the pipe ribs and against the forward flank of the ribs and the bottom of the grooves. This effects an immediate cooling, and also provides lubrication of the wall of the calibrating device.

The invention will be explained in greater detail in the following with reference to the accompanying drawing, which schematically depicts an exemplary embodiment of an extruder assembly in accordance with the invention.

The drawing shows only the outer end of the Archimedean screw or feed screw 2 of the extruder 1. The screw's external, helical ribs 3 press the plastic material 4 out through an outwardly diverging, conical transition sleeve 5, whose exit diameter will depend on the diameter of the pipe that is being formed. The screw 2 is extended by a mandrel 6, which thus rotates in the same direction and at the same rate of speed as the screw. The mandrel is provided with external, helical ribs 7 for transporting the plastic mass through the final molding tool 8. The ribs 7 have been given a very smooth surface and formed to exact tolerances in relation to the internal surface of the sleeve 7'. In addition to feeding the plastic material, the helical ribs 7 will support and center the mandrel 6. The molding tool 8 is divided into three zones. The first part or zone 9 has a smooth, cylindrical, internal molding surface 10. Following this comes a second part or zone 11 having a spiral-shaped groove 12 wherein the groove progressively decreases in depth. This part provides a degree of compression of the mass, which is important for the subsequent molding of the pipe ribs. The critical factor, however, is that the groove 12 performs an initial, soft molding of the cylindrical pipe wall that has been formed by the molding surface 10, thus forming a nascent external rib on the outer wall of the pipe. The last zone or part 13 of the molding tool has an internal, helical groove 14, which finishes molding the external ribs 15 on the pipe 16.

The plastic mass which is fed out of the extruder is thus set in rotation by the rotating mandrel 6. As the mass simultaneously rotates and is advanced in the axial direction, a cylindrical pipe is molded in the mold part 9 of the molding tool 8. After the plastic material has been compressed in the mold part 11, the external ribs are formed in the mold part 13. A lubricating device 17 is located at the part 9 of the molding tool. The lubricating device consists of five annular disks 18, which can be adjustably clamped together. Lubricant is supplied through a radial channel 19 and an axial groove 20, which distributes the lubricant to the respective slots 21 between the annular disks. The disks 18 are arranged in an opening between parts 9' and 9" of the mold part 9. By means of a clamping ring 21 with an offset portion 22 which engages with an indentation on the part 9', the parts 9', 9" and the disks 18 can be clamped together by means of a screw bolt 24 and nut 25. The bolt 24 is screwed into the stationary part 26 of the extruder.

Provided downstream of the molding tool 8 is a calibrating device 27 with an annular groove 28, said groove having a larger axial width than the ribs 15 formed on the pipe 16. Therefore, only the forward flank of the helical ribs 29 in the calibrating device 27 push against the pipe ribs 15. The grooves 28 in the calibrating device 27 also have a greater radial depth than the height of the ribs 15. Through a slot 30 in the calibrating sleeve 31, cooling liquid is supplied to the grooves 28.

The mandrel 6 is extended to project beyond the end of the calibrating device 27, and the outer end 6' of the mandrel is slightly conically tapered to ensure reliable release of the pipe. The free end of the mandrel will support the pipe as it exits from the calibrating device, before the pipe is guided into a cooling means.

The invention is not restricted to the exemplary embodiment discussed above and illustrated in the drawing. For example, a smaller or larger number of annular disks 18 may be provided. In some cases, it might even be sufficient to provide only one disk 18, in which case the slot 20 will occur between the radial edge of the disk and the stationary parts of the molding tool. The lubricating device 17, which in the exemplary embodiment is arranged at the cylindrical molding part 10, could instead be arranged at the spiral-shaped part or even at the part 13, which molds the final external ribs on the pipe. The supply of lubricant can also be provided in different ways. Thus, only one single channel 19 could be provided together with an annular distribution groove, which would distribute the lubricant from the channel around the entire circumference of all the disks.

I claim:

1. An extruder assembly (1) for extruding round, cylindrical plastic pipe having a smooth inner wall and a ribbed or ridged outer pipe wall, comprising a feed screw (2) for transporting and softening the plastic material (4) and an annular nozzle having a central mandrel (6) which constitutes a cylindrical, coaxial extension of the feed screw, wherein the stationary, outer mold part (8) of the nozzle is provided with one or more parallel, helical grooves (14) with the spiral extending in the direction of rotation of the screw and mandrel, wherein the outer mold part (8) is provided with a lubricating device (17) for lubricating the molding surface of the mold part, and wherein a calibrating device (27) with helical grooves (28) is provided downstream of the annular nozzle, characterized in that the lubricating device (17) consists of slots (21) between parts of the outer mold wall, which parts are movable in relation to each other for adjusting the slot width, and that the slot or slots (21) are connected to a lubricant source (19) that supplies lubricant under pressure.

2. An extruder assembly according to claim 1, characterized in that the movable parts consist of annular disks (20).

3. An extruder assembly according to claim 2, characterized in that the radial end surfaces of the disks (20) have a roughened surface.

4. An extruder assembly according to claim 2, characterized in that the disks are divided into segments.

5. An extruder assembly according to claim 2, characterized in that one or more radial lubricant channels (19) are connected to the outer periphery of the disks (20), which via respective axial channels or lubricant grooves distribute the lubricant to all of the slots (21) between the disks, and optionally to the slots between the outer disks and the adjacent edge of the stationary mold part.

6. An extruder assembly according to claim 1, characterized in that the lubricating device (17) is arranged at a section of the nozzle having a plane, circular molding surface, which is located upstream of the part that is provided with helical grooves.

7. An extruder assembly (1) for extruding round, cylindrical plastic pipe having a smooth inner pipe wall and a ribbed or ridged outer pipe wall, comprising a feed screw (2) for transporting and softening the plastic material (4), and an annular nozzle having a central mandrel (6) which constitutes a cylindrical, coaxial extension of the feed screw, wherein the stationary outer mold part (8) of the nozzle is provided with one or more parallel, helical grooves (14) with the spiral extending in the direction of rotation of the screw and mandrel, wherein the outer mold part (8) is provided with a lubricating device (17) for lubricating the molding surface of the mold part, and wherein a calibrating device (27) with helical grooves (28) is provided downstream of the annular nozzle, characterized in that the grooves (28) of the calibrating device (27) have a greater axial width than the width of the ribs molded in the molding tool (8).

8. An extruder assembly according to claim 7, characterized in that the grooves (28) also have a greater radial height than the ribs (15) on the pipe (16).

9. An extruder assembly according to claim 7, characterized in that the grooves (28) in the calibrating device (27) receive a direct supply of cooling liquid through one or more slots (30) in the calibrating sleeve (31).

10. An extruder assembly (1) for extruding round, cylindrical plastic pipe having a smooth inner pipe wall and a ribbed or ridged outer pipe wall, comprising a feed screw (2) for transporting and softening the plastic material (4), and an annular nozzle having a central mandrel (6) which constitutes a cylindrical, coaxial extension of the feed screw, wherein the stationary, outer mold part (8) of the nozzle is provided with one or more parallel, helical grooves (14) with the spiral extending in the direction of rotation of the screw and mandrel, wherein the outer mold part (8) is provided with a lubricating device (17) for lubricating the molding surface of the mold part, and wherein a calibrating device (27) with helical grooves (28) is provided downstream of the annular nozzle, characterized in that the free end of the mandrel (6) projects outwardly beyond the end of the calibrating device (27).

11. An extruder assembly according to claim 10, characterized in that the end section (6') of the mandrel is slightly conically tapered.

* * * * *